United States Patent
Wuebker et al.

(10) Patent No.: US 10,346,548 B1
(45) Date of Patent: Jul. 9, 2019

(54) APPARATUS AND METHOD FOR PREFIX-CONSTRAINED DECODING IN A NEURAL MACHINE TRANSLATION SYSTEM

(71) Applicant: Lilt, Inc., Stanford, CA (US)

(72) Inventors: Joern Wuebker, Stanford, CA (US);
Spence Green, Stanford, CA (US);
Minh-Thang Luong, Stanford, CA (US); John DeNero, Stanford, CA (US)

(73) Assignee: Lilt, Inc., Stanford, CA (US)

( * ) Notice: Subject to any disclaimer, the term of this patent is extended or adjusted under 35 U.S.C. 154(b) by 0 days.

(21) Appl. No.: 15/716,371

(22) Filed: Sep. 26, 2017

Related U.S. Application Data

(60) Provisional application No. 62/399,944, filed on Sep. 26, 2016.

(51) Int. Cl.
*G06F 17/28* (2006.01)
*G06F 17/27* (2006.01)
*G10L 25/30* (2013.01)

(52) U.S. Cl.
CPC ........ *G06F 17/289* (2013.01); *G06F 17/2735* (2013.01); *G10L 25/30* (2013.01)

(58) Field of Classification Search
CPC ..................................................... G06F 17/28
See application file for complete search history.

(56) References Cited

U.S. PATENT DOCUMENTS

| | | | | |
|---|---|---|---|---|
| 7,165,019 | B1 * | 1/2007 | Lee | G06F 17/2715 704/10 |
| 8,996,356 | B1 * | 3/2015 | Yang | G06F 3/0237 704/1 |
| 2002/0040292 | A1 * | 4/2002 | Marcu | G06F 17/271 704/4 |
| 2003/0191626 | A1 * | 10/2003 | Al-Onaizan | G06F 17/2223 704/8 |
| 2007/0150257 | A1 * | 6/2007 | Cancedda | G06F 17/2827 704/2 |

(Continued)

OTHER PUBLICATIONS

Bandanau, D. et al. (2015). "Neural Machine Translation by Jointly Learning to Align and Translate," ICLR 2015, pp. 1-15.

(Continued)

*Primary Examiner* — Paras D Shah
(74) *Attorney, Agent, or Firm* — Cooley LLP

(57) ABSTRACT

An apparatus has a network interface circuit to receive a source sentence from a network connected client device. A processor is connected to the network interface circuit. A memory is connected to the processor. The memory stores translation data and instructions executed by the processor. The instructions executed by the processor operate a neural machine translation system. A translation hypothesis is formed from a prefix of a target sentence comprising an initial sequence of target words supplied by a user through an interface. The hypothesis is generated by the neural machine translation system that performs a constrained prefix decoding that repeatedly predicts a next word from previous target words. A suffix of the target sentence comprising a final sequence of words corresponding to a final sequence of words in the source sentence is formed using a beam search that constrains translation to match the prefix.

6 Claims, 3 Drawing Sheets

(56) References Cited

U.S. PATENT DOCUMENTS

| | | | |
|---|---|---|---|
| 2008/0195372 A1 | 8/2008 | Chin et al. | |
| 2012/0123765 A1* | 5/2012 | Estelle | G06F 17/277 704/3 |
| 2013/0066895 A1* | 3/2013 | Choi | G06F 17/3064 707/760 |
| 2014/0129208 A1* | 5/2014 | Brown | G06F 17/289 704/3 |
| 2014/0156258 A1* | 6/2014 | Suzuki | G06F 17/2836 704/3 |
| 2014/0303959 A1* | 10/2014 | Orsini | G06F 17/289 704/2 |
| 2015/0134321 A1* | 5/2015 | Fennell | G06F 17/28 704/2 |
| 2015/0169550 A1* | 6/2015 | Cvijetic | G06F 17/289 704/2 |
| 2015/0227509 A1* | 8/2015 | Landau | G06F 17/289 704/2 |
| 2015/0331855 A1* | 11/2015 | Rylov | G06F 17/28 704/2 |
| 2016/0117316 A1* | 4/2016 | Le | G06F 7/023 704/9 |
| 2016/0124943 A1* | 5/2016 | Zu | G06F 17/2827 704/4 |

OTHER PUBLICATIONS

Brown, P.F. et al. (1993). "The mathematics of statistical machine translation: Parameter estimation," *Computational Linguistics* 19(2):263-311.

Cho, K. et al. (2014). "Learning Phrase Representations using RNN Encoder-Decoder for Statistical Machine Translation," 15 total pages.

Sutskever, I. et al. (2014). "Sequence to Sequence Learning with Neural Networks," pp. 1-9.

* cited by examiner

APPARATUS AND METHOD FOR PREFIX-CONSTRAINED DECODING IN A NEURAL MACHINE TRANSLATION SYSTEM

CROSS-REFERENCE TO RELATED APPLICATION

This application claims priority to U.S. Provisional Patent Application Ser. No. 62/399,944, filed Sep. 26, 2016, the contents of which are incorporated herein by reference.

FIELD OF THE INVENTION

This invention relates generally to automated translation from a source language to a target language. More particularly, this invention is directed toward neural machine translation.

BACKGROUND OF THE INVENTION

Various statistical techniques, such as phrase-based inference, are used to translate phrases from a source language to a target language. There are ongoing needs to improve the accuracy and speed of such translations.

SUMMARY OF THE INVENTION

An apparatus has a network interface circuit to receive a source sentence from a network connected client device. A processor is connected to the network interface circuit. A memory is connected to the processor. The memory stores translation data and instructions executed by the processor. The translation data includes a set of word alignments produced from source sentences and corresponding target sentences, and a terminology dictionary of zero or more source words and phrases and corresponding translations. The instructions executed by the processor operate a neural machine translation system trained on a corpus of source sentences and corresponding target sentences. The neural machine translation system is trained to predict a sequence of target words given a new source sentence. A translation hypothesis is formed from a prefix of a target sentence comprising an initial sequence of target words supplied by a user through an interface. The hypothesis is generated by the neural machine translation system that performs a constrained prefix decoding that repeatedly predicts a next word from previous target words. A suffix of the target sentence comprising a final sequence of words corresponding to a final sequence of words in the source sentence is formed using a beam search that constrains translation to match the prefix. The target sentence is supplied to the network interface circuit for delivery to the network connected client device.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
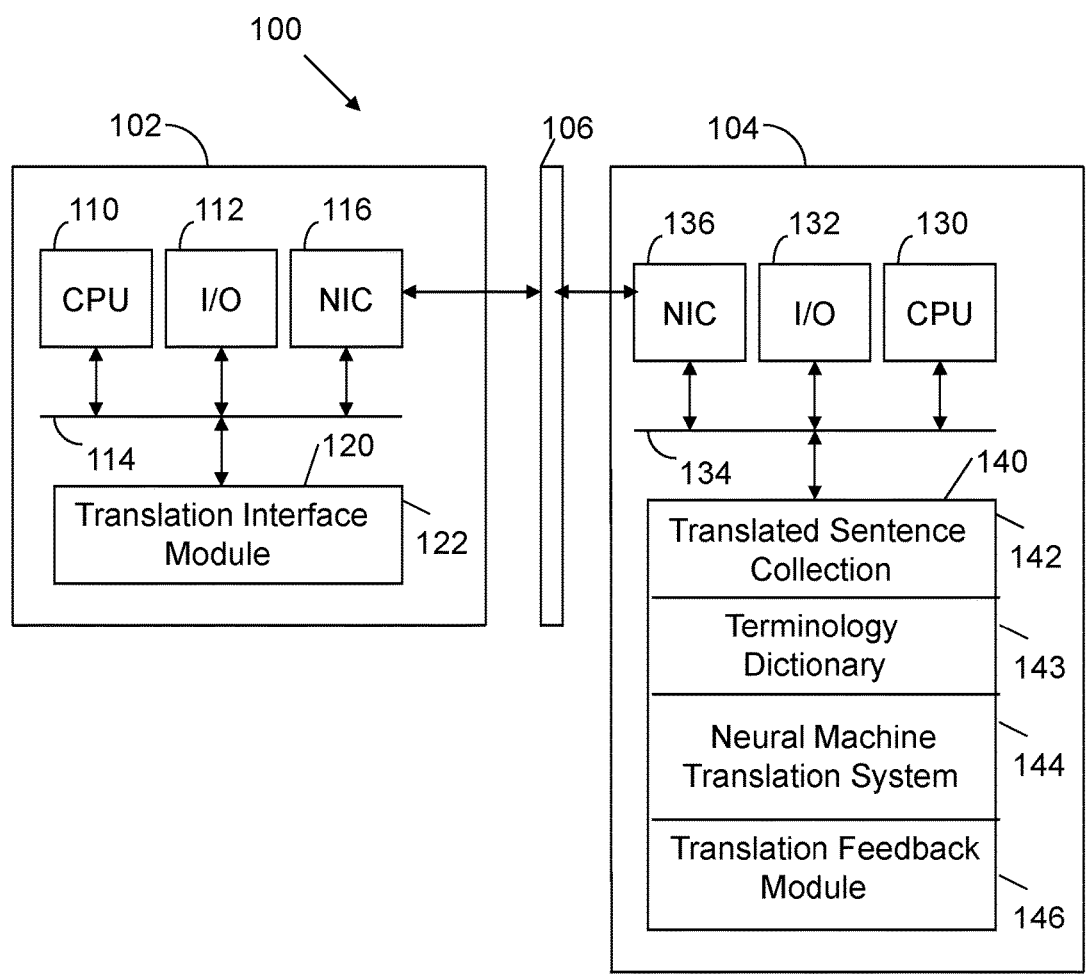
FIG. 1 illustrates a system configured in accordance with an embodiment of the invention.

FIG. 1 illustrates a system 100 configured in accordance with an embodiment of the invention. The system 100 includes a client device 102 in communication with a server 104 via a network 106, which may be any combination of wired and wireless networks.

Client device 102 may be a computer, tablet, smartphone and the like. The client device 102 includes a processor (e.g., a Central Processing Unit or CPU) 110 and input/output devices 112 connected via a bus 114. The input/output devices 112 may include a keyboard, mouse, touch display and the like. A network interface circuit 116 is also connected to the bus 114. The network interface circuit 116 provides connectivity to network 106. A memory 120 is also connected to the bus 114. The memory stores a translation interface module 122, which includes instructions executed by processor 110. The translation interface module 122 includes instructions to communicate with server 104 to obtain an interface that accepts a phrase in a source language. The phrase in a source language is communicated to the server 104 to obtain a translation of the phrase to a target language. The translation interface module 122 also includes instructions executed by the processor 110 to display the translation and solicit input on the quality of the translation.

Server 104 includes a processor 130, input/output devices 132, a bus 134 and a network interface circuit 136. A memory 140 is connected to bus 134. The memory 140 stores instructions to implement operations associated with the invention. In particular, the memory 140 stores a translated sentence collection 142. The translated sentence collection is a corpus of phrases in a source language and corresponding phrases in a target language.

The memory also stores a terminology dictionary 143. A terminology dictionary is important to human translators. A terminology dictionary is a list of source words and phrases and their translations. Typically, the terminology dictionary differs from the corpus (e.g., translated sentence collection 142) on which the neural machine translation system is trained only in the length of source sentences included in the data. Dictionary entries tend to be shorter in length than the full sentences included in the training data on which the neural machine translation system is trained. The terminology dictionary 143 has tailored translations that the human translator is likely to invoke.

The memory 140 also stores a neural machine translation system 144, the operations of which are discussed in detail below. The memory 140 also stores a translation feedback module 146 with instructions executed by the processor 130 to communicate to the client device a translated phrase.

Figure 2A:
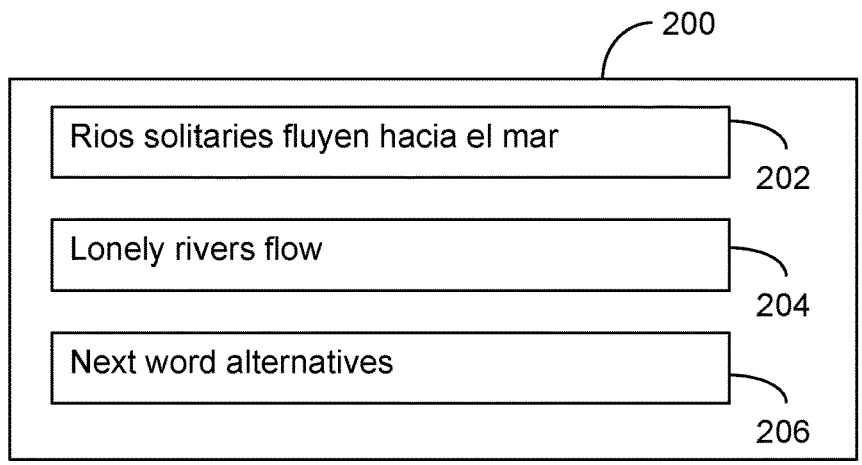
FIGS. 2A-2C illustrate user interfaces that may be utilized in accordance with embodiments of the invention.
Figure 2B:
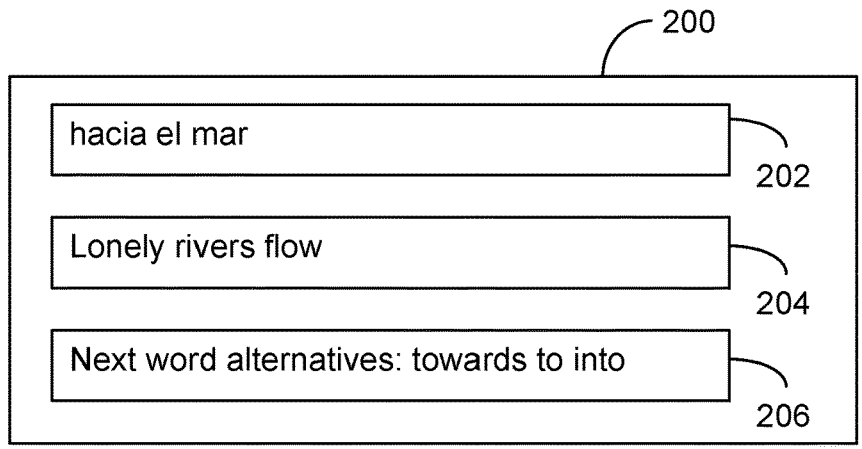

FIG. 2A illustrates an interface 200 that may be used in accordance with an embodiment of the invention. The interface 200 includes a text entry box 202 into which a user can type a source sentence, Spanish in this example. A translated text box 204 provides target language predictions, which are generated by the neural machine translation system's decoder. In the case of an unconstrained decoding, the neural machine translation system 144 simply populates the translated text box 204 with a translation. In the case of a constrained prefix decoding, the user supplies a prefix in the form of an initial sequence of words corresponding to an initial sequence of target words. Constrained decoding means that the machine translation decoder is restricted to generating translation that match some constraint, in this case that the translation match the initial sequence of target words supplied by the user. In the example of FIG. 2B, the user enters a prefix of "Lonely rivers flow", which constitutes the first part of a translation into the target language, English in this example. At this point, the neural machine translation system 144 predicts the rest of the translation by generating a suffix. Because human translators are often focused on the next word to type, the system can also predict next word alternatives in block 206. These predictions are based on the partial translation entered into the text area, and the predictions change as the user adds, changes, and/or removes words from the partial translation. A next word alternatives box, which shows more alternatives for the next word or phrase after the end of the partial translation may display alternate translated words that may be selected by a user.

Figure 2C:
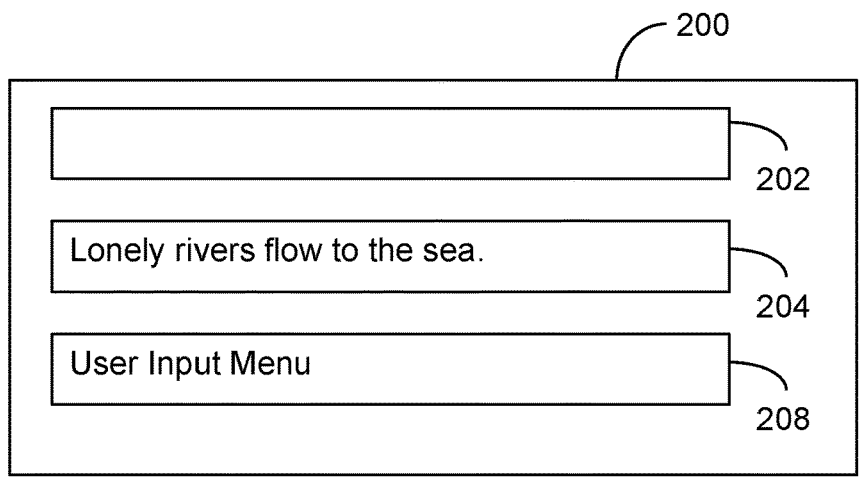

FIG. 2C illustrates an empty text entry box 202, which indicates that the sentence has been translated. Translated text box 204 displays the translated sentence in the target language. A user input menu 208 may be displayed at this point to solicit feedback from the user about the quality of the translation. There may also be a menu selection that allows a user to rate the translation (e.g., on a zero to five star scale). Another menu selection may allow a user to comment on a translation.

Figure 3:
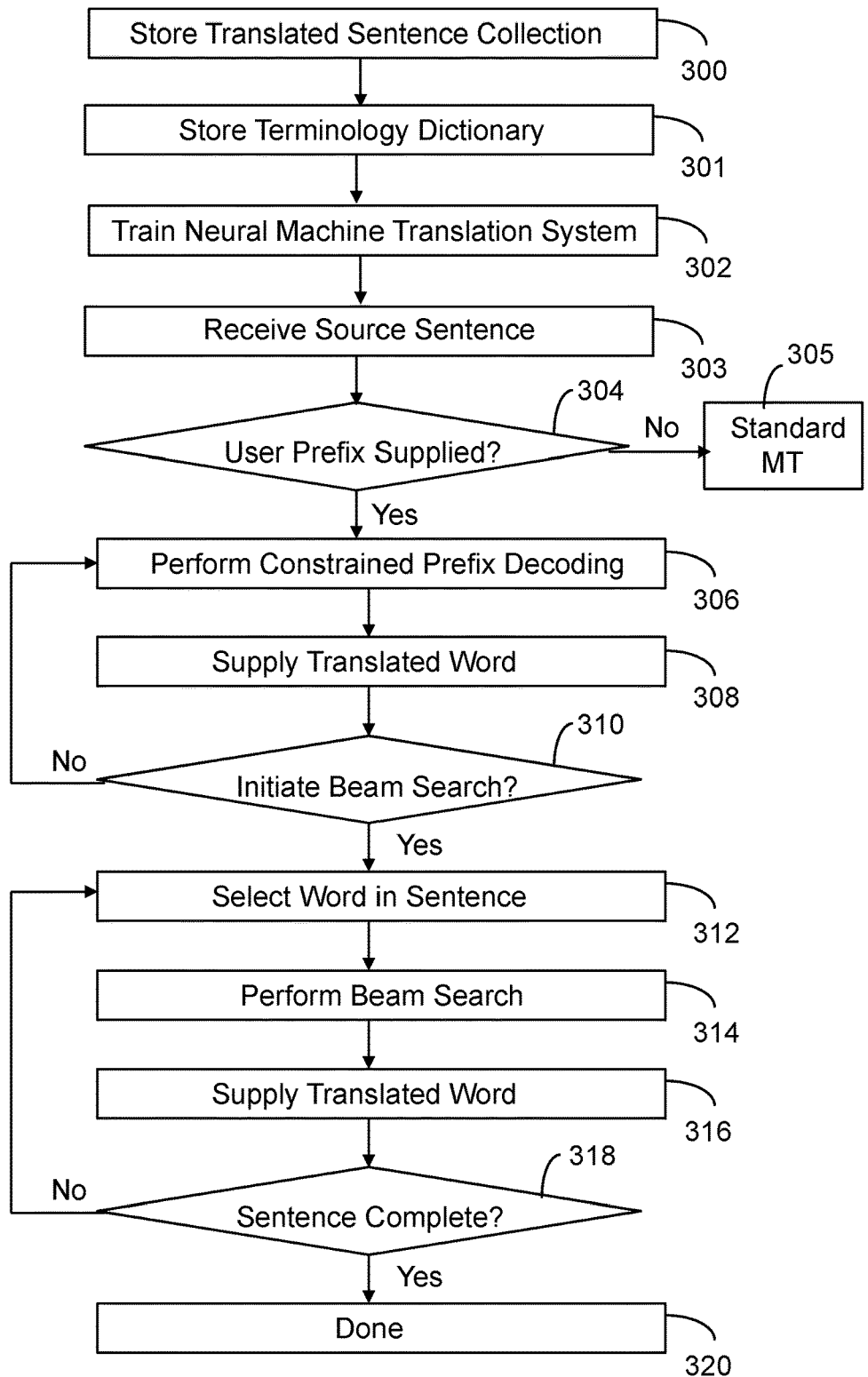
FIG. 3 illustrates processing operations performed in accordance with an embodiment of the invention.

FIG. 3 illustrates processing operations associated with an embodiment of the invention. Initially, a translated sentence collection is stored 300. FIG. 1 illustrates translated sentence collection 142 stored in memory 140. Next, a terminology dictionary is stored 301. FIG. 1 illustrates terminology dictionary 143.

Next, a neural machine translation system is trained 302. Neural machine translation (NMT) is an approach to machine translation that uses a large neural network. It departs from phrase-based statistical translation approaches that use separately engineered subcomponents, which are then weighted either manually or according to an optimization criterion. In contrast, neural machine translation models use deep learning and representation learning. They typically require less memory than traditional statistical machine translation models since they do not require either a large target-side language model or a translation model that is proportional to the training data size. Furthermore, unlike conventional statistical machine translation systems, all parts of the neural translation model are trained jointly (end-to-end) to maximize the translation accuracy. A bidirectional recurrent neural network, known as an encoder, is used by the neural network to encode a source sentence for a second recurrent neural network, known as a decoder, which is used to predict words in the target language. Alternately, convolution neural networks or feed-forward networks may be used. Characteristics of the neural machine translation system are detailed below.

The next operation in FIG. 3 is to receive a source sentence 303. It is then determined whether a user prefix is supplied 304. If not (304—No), then a standard machine translation is performed 305. The operations of the invention are invoked when a user supplies a prefix (304—Yes), in which case prefix constrained decoding is performed 306. A translated word is then supplied 308. It is then determined whether to initiate a beam search 310. If not (310—No), the processing of blocks 306 and 308 is repeated. If so (310—Yes), a word in the sentence is selected. A beam search is then performed 314.

A beam search uses breadth-first search to build a search tree. At each level of the tree, it generates all successors of the states at the current level, sorting them in increasing order of heuristic cost. However, it only stores a predetermined number, β, of best states at each level (called the beam width). Only those states are expanded next. The greater the beam width, the fewer states are pruned. With an infinite beam width, no states are pruned and beam search is identical to breadth-first search. The beam width bounds the memory required to perform the search. Since a goal state could potentially be pruned, beam search sacrifices completeness (the guarantee that an algorithm will terminate with a solution, if one exists). Beam search is not optimal (that is, there is no guarantee that it will find the best solution). It returns the first solution found. The beam width can either be fixed or variable. One approach that uses a variable beam width starts with the width at a minimum. If no solution is found, the beam is widened and the procedure is repeated. Characteristics of the utilized beam search are discussed below.

After a beam search is performed 314, a translated word is supplied 316. If the sentence or phrase has not been fully processed (318—No), operations 312-316 are repeated. When the entire sentence is processed (318—Yes), processing is done 320.

The disclosed system takes input in the form of a source sentence and a prefix of the target sentence. It predicts a suffix: a sequence of tokens that extends the prefix to form a full sentence. In an interactive setting, the first words of the suffix are critical; these words are the focus of the user's attention and can typically be appended to the translation with a single keystroke. Therefore, one attractive change to the optimization criterion scores the correctness of the whole suffix, and adds a component that is particularly sensitive to these first words. In a conventional statistical phrase-based system, inference for this task involves aligning the prefix to the source, then generating the suffix by translating the unaligned words. In a neural machine translation system, alignment is performed implicitly, so this step may be skipped.

Let F and E denote the set of all source and target language strings, respectively. Given a source sentence f∈F and target prefix $e_p$∈E, a predicted suffix $e_s$∈E can be evaluated by comparing the full sentence e=$e_p e_s$ to a reference e*. Let $e_s$* denote the suffix of the reference that follows $e_p$.

An embodiment of the invention is an interactive neural translation system in which a human translator produces a translation of a sentence in collaboration with the neural machine translation system 144. The translator is able to generate a translation word by word, and the system generates a potential completion of the sentence that would have high likelihood under the probability distribution implied by the parameters of the neural machine translation model.

Neural machine translation (NMT) models the conditional probability p(e|f) of translating a source sentence f to a target sentence e. In the encoder-decoder NMT framework (see: Sutskever et al., 2014; Cho et al., 2014), an encoder computes a representation s for each source sentence. The neural machine translation model is trained to fit an objective function for translating the words of full sentences. For example, it could be trained to maximize the conditional likelihood of the next word following a translation prefix, which is a standard training objective in neural translation and an ideal fit for this interactive system.

$$\log p(e|f) = \sum_{i=1}^{|e|} \log p(e_i | e_{<i}, f, s)$$

The individual probabilities in the equation above are often parameterized by a recurrent neural network (although other network architectures, such as convolutional neural networks, are also possible) which repeatedly predicts the next word $e_i$ given all previous target words $e < i$. As enumerating all possible target sentences is infeasible, finding the translation e with the highest probability is approximated with a beam search procedure, which is formalized in the following algorithm.

k: beam size
EOS: end of sentence symbol
V: target language vocabulary
$\epsilon$: empty sequence
beam={$\epsilon$}
finished=Ø
while ∃ h ε beam with h not marked as finished:

$$\text{new\_beam} = \text{top}(k)_{e_{i+1} \in V, e_1 \ldots e_i \in \text{beam}} \, p(e_1 \ldots e_i e_{i+1} | f)$$

for all h=$e_1 \ldots e_i e_{i+1} \in$ new_beam:
  if $e_{i+1}$=EOS:
    mark h as finished
    finished=finished $\cup$ {h}
    k=k-1
  beam=new_beam $$\text{output } \hat{e} = \text{argmax}_{e_1 \ldots e_i \in \text{finished}} \log(p(e_1 \ldots e_i | f))/lp \, (e_1 \ldots e_i)$$

with length penalty $lp(e_1 \ldots e_i) = (5+i)^\alpha/(5+1)^\alpha$
with meta-parameter $\alpha$ The procedure starts with a beam containing only the empty sequence. Then the procedure continuously produces the next beam by emitting a single target language word, so that all hypotheses in the same beam are sequences of the same length. At each step the likelihood for expanding all partial sequences (called "hypotheses") is computed from the previous beam with all words in the target vocabulary to select the highest probability hypotheses for the next beam. When a hypothesis is expanded with the end of sentence symbol EOS, it is marked as finished and the beam size for the next beam is decremented accordingly. When there are no more unfinished hypotheses in the last beam, the search terminates. Finally, the procedure computes the length penalty for all finished hypotheses and select the highest scoring one as the translation output. In one embodiment, the length penalty is computed using the techniques described in Yonghui Wu et al., "Google's Neural Machine Translation System: Bridging the Gap between Human and Machine Translation" (https://arxiv.org/pdf/1609.08144.pdf)

To provide interactive suggestions from a neural machine translation system, the beam search can be modified to constrain each hypothesis to match the partial translation typed into the interface (e.g., 200). The beam is now split into two stages: constrained and unconstrained. In the first stage, which is constrained, hypotheses are only added to each beam if they are compatible with the partial translation from the user. "Compatibility" means that for a hypothesis $e_1, \ldots, e_i$, the first i words of the partial translation are equal to $e_1, \ldots, e_i$. In the constrained stage—the next word to predict $e_i$ is known—we set the beam size to 1, aggregate the score of predicting $e_i$ immediately without having to sort the softmax distribution over all words, and feed $e_i$ directly to the next time step. When i equals the length of the partial translation, then the beam search transitions to the second stage, which is unconstrained.

In the second stage, the decoder switches to standard beam search with a larger beam size. In this mode, the most probable word $e_i$ is passed to the next time step. In the algorithm above, this corresponds to replacing the empty hypothesis in the initial beam by the prefix $p_1 \ldots p_j$:

beam={$p_1 \ldots p_j$}

If the source side of a term from this dictionary appears in a given sentence to be translated, the neural machine translation system is required to contain the target side of this term in the output. In one embodiment, this is achieved by leveraging the attention mechanism (Bandanau et al., 2014) that is incorporated into most NMT systems. Each time a target language word is emitted, the NMT system produces a probability distribution over all words of the source sentence, which can be interpreted as a measure of importance of each of the source words in producing the newly emitted target word. Formally, when emitting the i-th target word $e_i$, we compute the attention probabilities $a_{ij}$ for the j-th source word as follows:

$$a_{ij} = \frac{\hat{a}_{ij}}{\sum_j \hat{a}_{ij}}$$

$$\hat{a}_{ij} = f_{att}(s_i, h_j)$$

$f_{att}$ is the attention function that may take different forms. $s_i$ is the hidden RNN state at position i and $h_j$ is the representation of the source sentence at position j.

When the sum of the attention probabilities for all source words of a given terminology entry is greater than a fixed threshold, e.g. 50%, we commit to this term and output its target words regardless of their likelihood under the probability model.

Assuming that the terminology entry spans positions j j+m in the source segment, the sum of the attention probabilities is computed as $$\sum_{j \ldots j+m} a_{ij}$$

Then, this particular term is removed from the candidates for this segment and we transition back to standard beam search. The terminology constrained translation is applicable to greedy search, i.e. beam search with a beam size of k=1. We can formalize the resulting algorithm as follows.

t: terminology matches
EOS: end of sentence symbol
V: target language vocabulary
$\epsilon$ empty sequence
hypothesis=$\epsilon$ $f = f_1 \ldots f_n$ (a) while not finished:

$e_1 \ldots e_i$ = hypothesis for$(f_i \ldots f_{j+m}, e_1 \ldots e_{1+r}) \in t$ $\quad$ if $\sum_{j \ldots j+m} a_{ij} > 0.5$:

$\quad\quad$ hypothesis = $e_1 \ldots e_i e_1 \ldots e_{1+r}$ $\quad\quad$ continue(a)

hypothesis = argmax$_{e_{i+1} \in V} p(e_1 \ldots e_i e_{i+1} | f)$

-continued if $e_{i+1} == EOS$:

output $\hat{e} = e_1 \ldots e_i e_{i+1}$ break

To make this algorithm fast enough for the interactive translation, we apply vocabulary selection by replacing the full vocabulary V with a subset V' by selecting K candidates per source word:

$$V' = \bigcup_{f_i \in f} [\text{argmax}_{(e, f_i) \in W} \#(e, f_i)]$$

The K candidates are selected by first querying a separately trained set of word alignments W, which can be obtained, for example, by executing IBM model 2 (Brown et al., 1992) on the same training data used to train the NMT system. For each source word f in the sentence, all words e associated with this word in the set of word alignments are retrieved. These words are then ranked according to occurrence counts #(e,f) in the set W, and the top K target words are retained, for some positive value K. Word alignments are essentially a terminology dictionary 143 formed by a machine.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a network interface circuit to receive a source sentence from a network connected client device;
a processor connected to the network interface circuit; and
a memory connected to the processor, the memory storing translation data and instructions executed by the processor, the translation data includes:
a set of word alignments produced from source sentences and corresponding target sentences,
a terminology dictionary with source words and phrases and corresponding translations,
the instructions executed by the processor:
operate a neural machine translation system trained on a corpus of source sentences and corresponding target sentences, wherein the neural machine translation system is trained to predict a sequence of target words for each source sentence in the corpus of source sentences,
receive a new source sentence from the network connected client device,
receive a user prefix from the network connected client device, where the user prefix is an initial sequence of target words supplied by a user through an interface at the network connected client device,
form a translation hypothesis from the user prefix, wherein the translation hypothesis is generated by the neural machine translation system that performs a constrained prefix decoding that repeatedly predicts a next target word from previous target words of the user prefix,
form a suffix of the target sentence comprising a final sequence of target words corresponding to a final sequence of words in the new source sentence using a beam search that constrains translation to match the user prefix, and
supply the target sentence to the network interface circuit for delivery to the network connected client device.

2. The apparatus of claim 1 further comprising the memory storing instructions executed by the processor to compute a likelihood for expanding all hypotheses from a previous beam with all words in a target vocabulary and select a word with a highest probability for a next beam.

3. The apparatus of claim 1 further comprising the memory storing instructions executed by the processor to compute a length penalty for all finished hypotheses and select a word with a highest length penalty as translation output.

4. The apparatus of claim 1 further comprising the memory storing instructions executed by the processor to substitute a full vocabulary with a subset of the full vocabulary.

5. The apparatus of claim 1 further comprising the memory storing instructions executed by the processor to require the target sentence to include entries from the terminology dictionary when the probability assigned by an attention mechanism exceeds a threshold.

6. The apparatus of claim 1 further comprising the memory storing instructions executed by the processor to form a graphical user interface with a text entry area for the user prefix and a display area from which the user can select words and phrases to add to a translation.

* * * * *